United States Patent
Ruhl et al.

[11] Patent Number: 6,096,106
[45] Date of Patent: *Aug. 1, 2000

[54] ENDOTHERMIC REACTION APPARATUS

[75] Inventors: Robert C. Ruhl, Cleveland Heights, Ohio; Stephen Hardman, Letchworth, United Kingdom; Michael R. Kenyon, West Ewell, United Kingdom; Roderick A. McFarlane, Cheam, United Kingdom

[73] Assignee: The Standard Oil Company, Cleveland, Ohio

[*] Notice: This patent is subject to a terminal disclaimer.

[21] Appl. No.: 09/018,152

[22] Filed: Feb. 3, 1998

Related U.S. Application Data

[60] Continuation of application No. 08/700,794, Aug. 21, 1996, abandoned, which is a division of application No. 08/247,647, May 23, 1994, Pat. No. 5,565,009, which is a continuation of application No. 07/888,776, May 26, 1992, abandoned, which is a continuation-in-part of application No. 07/810,251, Dec. 19, 1991, abandoned, which is a continuation-in-part of application No. 07/504,375, Apr. 3, 1990, abandoned.

[51] Int. Cl.[7] .................. B01J 8/06; C01B 3/38
[52] U.S. Cl. ............ 48/197 R; 48/198.1; 48/198.7; 422/196; 422/197; 422/198; 422/202; 422/204; 423/651; 423/659
[58] Field of Search ............ 422/198, 200, 422/196–197, 202, 204; 48/198.1, 198.7, 197 R; 423/651, 659

[56] References Cited

U.S. PATENT DOCUMENTS

| | | |
|---|---|---|
| Re. 24,311 | 12/1957 | Mader .................... 422/197 |
| 1,934,836 | 11/1933 | Wietzel et al. . |
| 1,959,151 | 5/1934 | Beekley . |
| 2,018,619 | 10/1935 | Winkler et al. . |
| 2,039,603 | 5/1936 | Maier . |
| 2,078,948 | 5/1937 | Houdry .................. 422/200 |
| 2,291,762 | 8/1942 | Samans . |
| 2,294,430 | 9/1942 | Thayer . |
| 2,336,879 | 12/1943 | Mekler . |
| 2,483,132 | 9/1949 | Gaucher . |
| 2,491,518 | 12/1949 | Riblett . |
| 2,569,846 | 10/1951 | Cornell . |
| 2,683,152 | 7/1954 | Dickinson . |
| 2,852,358 | 9/1958 | Stengel ..................... 422/201 |
| 2,862,984 | 12/1958 | Bartholome et al. . |
| 2,933,291 | 4/1960 | Huggins . |
| 2,987,382 | 6/1961 | Endter et al. . |
| 3,132,010 | 5/1964 | Dwyer et al. . |
| 3,215,502 | 11/1965 | Korwin . |
| 3,264,066 | 8/1966 | Quartulli et al. . |
| 3,382,044 | 5/1968 | Cromeans . |

(List continued on next page.)

FOREIGN PATENT DOCUMENTS

| | | |
|---|---|---|
| 033128 | 8/1981 | European Pat. Off. . |
| 0247384 | 12/1987 | European Pat. Off. . |
| 0399833 | 11/1990 | European Pat. Off. . |
| 0450872A1 | 10/1991 | European Pat. Off. . |
| 702776 | 4/1931 | France . |
| 2331374 | 6/1977 | France . |
| 58-026002 | 2/1983 | Japan . |
| 1039756 | 8/1966 | United Kingdom . |
| 2050413 | 1/1981 | United Kingdom . |

*Primary Examiner*—Hien Tran
*Attorney, Agent, or Firm*—Renner, Otto, Boisselle & Sklar, P.L.L.

[57] ABSTRACT

An endothermic reaction furnace includes one or more elongated reaction tubes defining therein an endothermic reaction flow path and a combustion flow path for providing heat to drive the endothermic reaction. The combustion flow path is arranged so that fuel and combustion air are separately heated by the heat inside the furnace preferably to significantly above their autoignition temperature before being combined in a combustion zone where they mix, autoignite and burn. The fuel is introduced into the combustion zone by a plurality of tubes having outlet ends arranged to produce annular shrouds of flame around each reaction tube that are directed countercurrent to the endothermic reaction product.

33 Claims, 7 Drawing Sheets

U.S. PATENT DOCUMENTS

| | | |
|---|---|---|
| 3,531,263 | 9/1970 | Sederquist ................................. 48/61 |
| 3,541,729 | 11/1970 | Dantowitz . |
| 3,850,231 | 11/1974 | Creek . |
| 3,909,299 | 9/1975 | Corrigan ............................. 422/190 |
| 3,950,463 | 4/1976 | Jones . |
| 4,098,588 | 7/1978 | Buswell et al. . |
| 4,124,667 | 11/1978 | Coppola et al. . |
| 4,144,207 | 3/1979 | Ohnsorg . |
| 4,157,241 | 6/1979 | Samuelson . |
| 4,161,510 | 7/1979 | Edridge . |
| 4,179,299 | 12/1979 | Coppola et al. . |
| 4,207,226 | 6/1980 | Storm . |
| 4,221,763 | 9/1980 | Greene . |
| 4,224,298 | 9/1980 | Robinson . |
| 4,233,256 | 11/1980 | Ohnsorg . |
| 4,265,843 | 5/1981 | Dias et al. . |
| 4,266,600 | 5/1981 | Bieberbach . |
| 4,293,315 | 10/1981 | Sederquist ................................. 48/94 |
| 4,312,954 | 1/1982 | Coppola et al. . |
| 4,346,049 | 8/1982 | Coppola et al. . |
| 4,423,022 | 12/1983 | Albano et al. . |
| 4,692,306 | 9/1987 | Minet . |
| 4,714,593 | 12/1987 | Naito et al. . |
| 4,746,329 | 5/1988 | Christner et al. . |
| 4,810,472 | 3/1989 | Andrew et al. . |
| 4,849,187 | 7/1989 | Uozu et al. . |
| 4,861,347 | 8/1989 | Szydlowski et al. . |
| 4,861,348 | 8/1989 | Koyama et al. . |
| 4,909,808 | 3/1990 | Voecks . |
| 4,946,667 | 8/1990 | Beshty . |
| 4,959,079 | 9/1990 | Grotz ..................................... 252/373 |
| 5,106,590 | 4/1992 | Hopper et al. . |
| 5,110,564 | 5/1992 | Herbort ................................. 422/197 |
| 5,112,578 | 5/1992 | Murayama et al. ................... 422/197 |
| 5,264,008 | 11/1993 | Corrigan . |
| 5,283,049 | 2/1994 | Fluder et al. . |
| 5,565,009 | 10/1996 | Ruhl et al. ........................... 48/197 R |
| 5,567,398 | 10/1996 | Ruhl et al. ............................ 422/197 |

ENDOTHERMIC REACTION APPARATUS

CROSS REFERENCE TO RELATED APPLICATION

This application is a continuation of Ser. No. 08/700,794 filed Aug. 21, 1996 (now abandoned); which is a division of Ser. No. 08/247,647 filed May 23, 1994 (now U.S. Pat. No. 5,565,009); which is a continuation of Ser. No. 07/888,776 filed May 26, 1992 (now abandoned); which is a continuation-in-part of Ser. No. 07/810,251 filed Dec. 19, 1991 (now abandoned); which is a continuation-in-part of Ser. No. 07/504,375 filed Apr. 3, 1990 (now abandoned).

BACKGROUND OF THE INVENTION

The present invention relates to apparatus used in conducting endothermic reactions, and particularly to furnaces for reforming light hydrocarbons, especially mixtures of steam and/or carbon dioxide and light hydrocarbons.

Hydrogen for use in anmonia synthesis, methanol synthesis or hydrocracking plants, is frequently produced in a process using the following endothermic reforming reaction:

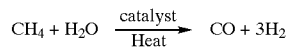

$$CH_4 + H_2O \xrightarrow[\text{Heat}]{\text{catalyst}} CO + 3H_2$$

The hydrocarbon can be methane, which is shown in the above reaction, or other light hydrocarbons, or mixtures of these such as natural gas. The same reactions may also be employed where the desired product is CO or both CO and $H_2$. Another endothermic reaction is the conversion (pyrolysis) of ethane to ethylene which also produces the by-product hydrogen ($H_2$), and this reaction requires heat only, usually about 950° C. and 3 atmospheres pressure, but needs no catalyst. The catalyst over which the methane reaction is carried out is, for example, nickel on an inert support, such as alumina, and is contained usually in vertical tubes which are supported in a furnace frequently called a "reforming furnace". Reforming furnaces are disclosed or schematically shown in the process flow diagrams of U.S. Pat. Nos. 3,132,010; 3,264,066; and 3,382,044.

The tubes in the usual reforming furnaces extend vertically with reactants being fed by a manifold to one end of the set of tubes and product-rich gases being withdrawn from the other end of the tubes. Because the reforming reaction occurs at a high temperature and is endothermic, heat must be supplied to the tubes to heat the reactants. The reaction is carried out in the tubes at a high temperature of about 1500° F. and at a pressure of about 150 to 450 psig.

Various efforts have been made to improve the performance of the reforming furnace or to improve the structure of the furnace to facilitate the maintenance and operation of the furnace. For example, U.S. Pat. No. 4,161,510 to A. J. Edridge teaches the use of a ceramic paint coating on the exposed surface of the reforming tubes in which the reaction is conducted, the paint being reflective to reduce fissure creep of the tubes. U.S. Pat. No. 4,714,593 to A. Naito et al. teaches a reforming apparatus which uses a catalyzed heat generating apparatus to achieve miniaturization of the furnace. U.S. Pat. No. 4,810,472 to S. P. Andrews et al. teaches a reforming apparatus which employs closed ended, double pass, externally heated, metal reformer tubes, also known as bayonet-tubes with controlled heat exchange between the product gas stream and the reactant stream across the wall of the tube.

Apparatus is also known which employs ceramic tubes for carrying out gas reactions in those ceramic tubes. For example, U.S. Pat. No. 2,987,382 to F. Endter et al. discloses such a ceramic tube furnace. Further, U.S. Pat. No. 2,018,619 to F. Winkler et al. teaches tubes made from material containing elementary silicon which may be embedded in other gas-tight tubes and which prevents carbon formation in carrying out pyrogenic conversion of hydrocarbons.

Known reforming furnaces are large and expensive, when measured as per unit of capacity, have tube lives shorter than would be desired, are prone to carbon deposition ("coking"), and must be frequently operated at temperatures below the ideally preferred values (for most efficient reactivity) due to the creep and corrosion behavior of their reforming tubes.

Therefore, it is an object of the present invention to provide an improved apparatus for conducting endothermic reactions, such as reforming light-hydrocarbons, and which will provide improved conversions, energy efficiency, and maintenance.

SUMMARY OF THE INVENTION

The present invention provides a unique furnace design in which the heat necessary to drive the endothermic reaction is generated inside the furnace by autoignition of a gaseous fuel and air. The flow paths of endothermic reactant and product, on the one hand, and air and gaseous fuel and combustion products therefrom, on the other hand, are arranged so that the air and fuel are separately heated by the heat generated inside the furnace to above their autoignition temperature before being combined in one or more combustion zones where they autoignite and combust. The flow paths are also arranged so that the combustion gases as well as the endothermic reaction product are cooled before exiting the furnace. By this means the need for separate ignition devices to initiate combustion of the fuel/air mixture in each combustion zone is eliminated. This is particularly valuable in large-scale, multi-tube reforming furnaces, since it allows close packing of the combustion tubes and also eliminates costly downtime and repair efforts needed to service inoperative ignition devices.

The inventive furnace is designed to have the endothermic reaction occur on the Inside of metallic reaction tubes, with the combustion of fuel and air occurring outside the tubes. According to the Invention, an endothermic reaction apparatus for effecting an endothermic reaction comprises:

a vessel, the vessel including an inlet port for an endothermic reactant to be subjected to an endothermic reaction to convert the reactant to an endothermic product, an outlet port for the endothermic product, and an exothermic reaction (combustion) chamber, a plurality of reaction tubes providing flow passages between the inlet and outlet ports, the reaction tubes extending through the exothermic reaction chamber from a downstream end to an upstream end of the exothermic reaction chamber, first and second supply passages for separately supplying first and second exothermic reactants (fool gas and air) to the exothermic reaction chamber for exothermically reacting within the exothermic reaction chamber and for providing flow of exothermic reaction products in a direction going from the upstream end to the downstream end of the exothermic reaction chamber, the first and second supply passages passing through a preheating zone within the vessel wherein heat is transferred to the exothermic reactants from the endothermic reaction product for preheating the exothermic reactants prior to mixing and exothermically reacting and for cooling the endothermic reaction product, and a plurality of feed tubes respectively associated with the reaction tubes and disposed to produce an annular shroud of flame around each reaction tube, the feed tubes each having an outlet end located at the upstream end of the exothermic reaction chamber and oriented to direct at least one of the exothermic reactants exiting therefrom in a direction substantially parallel to the reaction tubes such that the annular shroud of flame is directed countercurrent to the endothermic reaction product.

According to another aspect of the invention, a process for carrying out an endothermic reaction in an endothermic reaction apparatus in which an endothermic reactant is heated by exothermic reaction of two exothermic reactants to thereby convert the endothermic reactant into an endothermic product, comprises:

causing the endothermic reactant to flow through a plurality of reaction tubes wherein the reactant is to undergo the endothermic reaction, the reaction tubes extending through an exothermic reaction (combustion) chamber of a vessel from a downstream end to an upstream end of the exothermic reaction chamber, removing the endothermic reaction product from the vessel after flow through the reaction tubes, separately supplying first and second exothermic reactants (fuel gas and air) to the exothermic reaction flow path for reacting within the exothermic reaction chamber with the exothermic reaction products flowing in a direction going from the upstream end to the downstream end of the exothermic reaction chamber, and directing the first and second exothermic reactants into the exothermic reaction chamber for exothermically reacting and producing an annular shroud of flame around each reaction tube, said directing of one of the first and second exothermic reactants being effected by a plurality of feed tubes each having an outlet end located at the upstream end of the exothermic reaction chamber and oriented to direct such one exothermic reaction fluid exiting therefrom in a direction substantially parallel to the reaction tubes such that the annular shroud of flame is directed countercurrent to the endothermic reaction product, removing the exothermic reaction products from the vessel after passage through the exothermic reaction chamber, and wherein said separately supplying step includes passing the first and second exothermic reactants through a preheating zone within the vessel wherein heat is transferred to the exothermic reactants from the endothermic reaction product for preheating the exothermic reactants prior to mixing and reacting and for cooling the endothermic reaction product prior to removal from the vessel.

According to a further aspect of the invention, an apparatus for carrying out an endothermic reaction in which an endothermic reactant gas is heated by the combustion of air and a combustible fuel gas thereby to cause the reactant gas to form an endothermic product, which apparatus comprises:

vessel;

a plurality of metallic reaction tubes in the vessel dividing the interior of the vessel into a plurality of separate reaction tube flow paths collectively defining a reaction flow path for carrying out the endothermic reaction and a plurality of separate elongated flame flow paths outside the reaction tubes collectively defining a combustion flow path, the reaction flow path and the combustion flow path being in thermal communication with one another so that heat in the combustion flow path can be transferred to the reaction flow path;

respective heat generating means associated with each of the metallic reaction tubes for generating heat by the combustion of fuel gas and air with the resultant flames forming annular shrouds of flames around and extending along the reaction tubes;

an inlet port for causing the reactant gas to flow into the reaction flow path and an exit port for withdrawing endothermic product gas from the reaction flow path;

air and fuel gas supplies respectively adapted to separately supply air and fuel gas to each of the heat generating means, the heat generating means being located in the interior of the vessel whereby the air and fuel gas can be heated to above their autoigniton temperature prior to reaching the heat generating means; and an exit path for withdrawing combustion gas from the combustion flow path; and wherein the heat generating means are located at an upstream end of a combustion chamber in the vessel through which the metallic reaction tubes extend from a downstream end to the upstream end of the combustion chamber, and the heat generating means include a plurality of feed tubes respectively associated with the metallic reaction tubes, the feed tubes each having an outlet end located at the upstream end of the combustion chamber and oriented to direct the fuel gas exiting therefrom in a direction substantially parallel to the metallic reaction tubes such that the annular shroud of flame is directed countercurrent to the reactant gas/endothermic product.

The invention also provides a process for carrying out an endothermic reaction in the aforesaid endothermic reaction apparatus in which an endothermic reactant is heated by the combustion of air and a combustible fuel gas to thereby convert the reactant into an endothermic product, the method comprising:

via the inlet port causing the endothermic reactant to flow along the endothermic reactant flow paths, via the air and fuel gas supplies separately feeding the air and the fuel gas to each of the heat exchanging means, the fuel gas and air being heated to above their autoignition temperature prior to reaching the heat generating means so that the air and fuel gas autoignite and combust to produce heat in the combustion flow path with the resultant flames forming annular shrouds of flames around and extending along the reaction tubes, the heat being transferred to the endothermic reaction flow paths thereby causing the endothermic reaction to occur, via the outlet port withdrawing endothermic product gas from the reaction flow path, and via the exit path withdrawing combustion gas from the combustion flow path.

In a particular embodiment of apparatus according to the invention, the combustion means preferably employs concentric air and fuel supply tubes, which are most preferably also concentric with the metallic reaction tubes. This arrangement allows for close-packing of the tubes as well as autoignition of the fuel/air mixture, both of which features contribute to a simple design and ease of operation.

The present invention will become more apparent from the following description taken in conjunction with the accompanying drawings.

DESCRIPTION OF THE PREFERRED EMBODIMENTS

The present invention is described below in connection with a number of preferred embodiments. In one embodiment, which was described in my earlier application Ser. No. 07/504,375, filed Apr. 3, 1990, combustion is carried out inside of one or more ceramic tubes with the endothermic reaction being carried out in one or more reaction flow paths located outside the combustion tubes. In another preferred embodiment described below, the endothermic reaction is carried out inside of one or more metallic reaction tubes with combustion occurring in one or more combustion flow paths located outside the tubes. In both embodiments, as more fully described below, the flow paths of the various reactant and product gases are arranged so that the combustion air and fuel are separately heated to above their autoignition temperature before being combined in the interior of the furnace where they mix, autoignite and burn to provide the heat necessary to drive the endothermic reaction.

Ceramic Tube Embodiment

Figure 1:
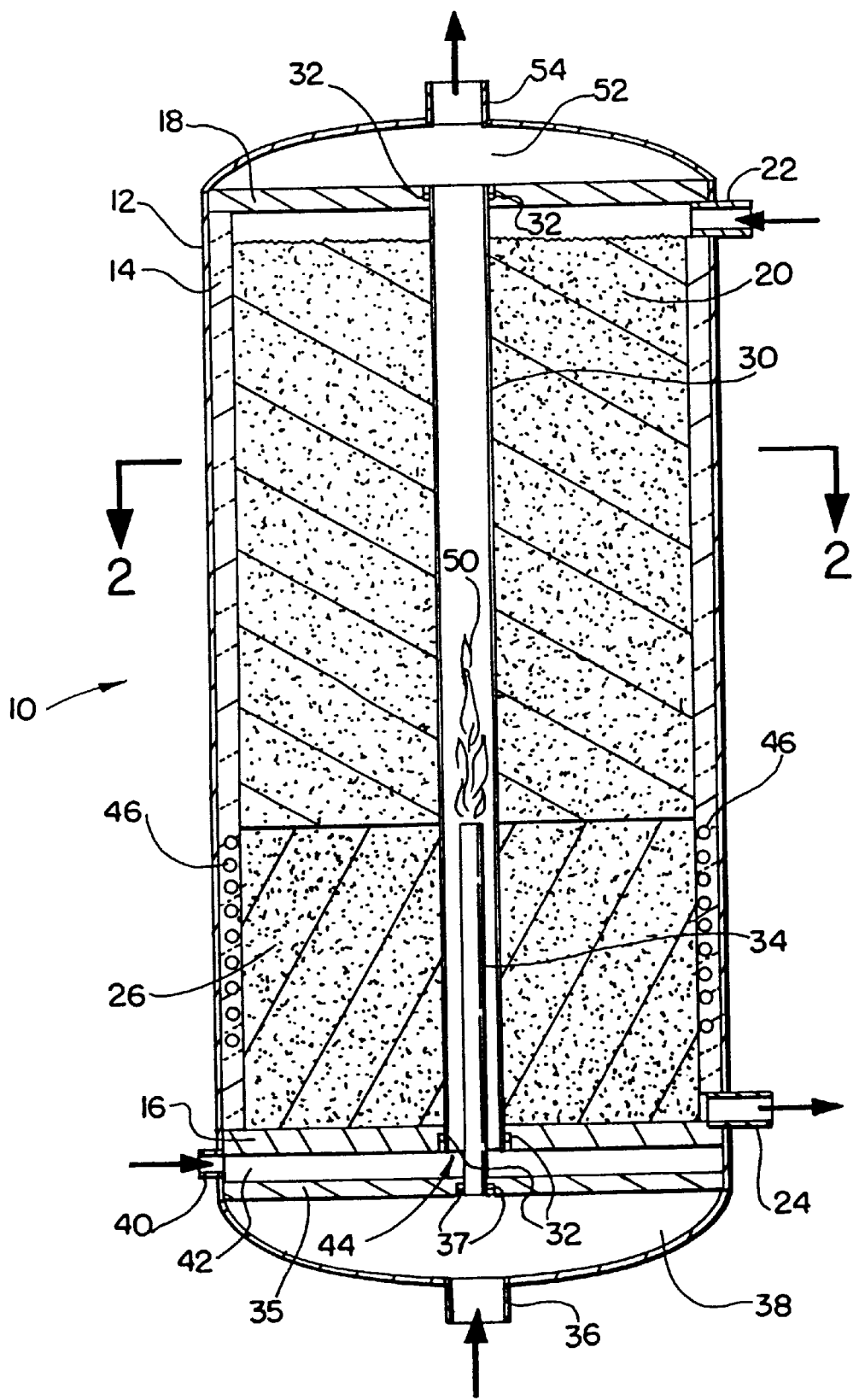
FIG. 1 is a cross sectional representation of the reforming apparatus of the present invention.

The reaction apparatus of this embodiment is shown generally at in FIG. 1. Although it is oriented vertically, it should be appreciated that it could be operated horizontally, and so is not limited to a particular orientation. The apparatus comprises a steel shell 12 lined inside with a refractory insulation material 14 having a bottom plate 16 (which may also be referred to as a tube sheet) sealed, by gaskets and bolting or the like, to the steel shell, and a top plate 18 (or top tube sheet), which together define the reaction vessel. The bottom plate 16 supports a catalyst bed 20 through which passes one or more combustion tubes 30, which are made of a ceramic material and are sealed to bottom plate 16 and top plate 18. The shape of the reformer 10 is generally cylindrical and could be described as somewhat similar in construction to a shell and tube heat exchanger. The ceramic burner tubes are sealed to plates 16 and 18 by a hollow screw (not shown) threaded into the tube sheet at the end of the tube in combination with a steel pressure ring which expands a graphite seal, preferably a graphite foil spiral wrapped annular cylinder seal (such as Grafoil brand foil from Union Carbide). These seals 32 will hold the combustion tube in place, and contain the much higher shell side gas pressures, yet allow it to expand thermally and individually without significant gas flow leakage past the seals. Also, it may be desirable to apply an axial compressive force or preload to each tube, which will tend to neutralize or subtract from the axial tensile stresses produced by heat flows, by incorporating, e.g., in the tube seal assembly a stack of Belleville type springs (not shown) or the like. Alternatively, the seals could be held in place by a device which also provides the axial compressive force. A feature of the present design is that it allows for the use of lower temperature seals where the combustion tube or tubes are joined to the tube sheet.

Steel shell 12 has one or more feed inlets 22 for passing the feed gas mixture which is to be reformed into the reformer and down through the packed bed 20 to exit through one or more product outlet(s) 24. The feed gas mixture, for example, may be a mixture of natural gas and steam if the endothermic reaction is methane reforming reaction, although the mixture could be natural gas and water, which converts to steam in the reactor, or only natural gas, with the steam coming from water fed separately into the reactor. As can be appreciated, other combinations of feed mixtures can be introduced. As illustrated in FIG. 1, the catalytic bed 20 which can be nickel on an alumina, inert support, or other appropriate catalyst, could include an inert section or zone 26, or the entire bed could consist of a single catalyst material or plural catalyst materials. In fact, the apparatus could be operated without a catalyst for some endothermic reactions.

Located concentrically inside combustion tube 30 is a fuel feed tube 34, which can be made from a metal alloy or a ceramic material. Fuel feed tube 34 is fixed to outer plate (or tube sheet) 35 by welding, or by using an o-ring or graphite foil seal 37. Fuel is fed from inlet 36 into fuel inlet manifold 38 to fuel feed tube 34. Air is fed via air inlet 40 to air inlet manifold 42 which is defined by outer plate 35 which is spaced apart from tube sheet 16 and which communicates with combustion tube 30 via annular inlet 44 so that air will flow in the space between the outer wall of fuel tube 34 and the inner wall of combustion tube 30. The combination of combustion tube 30 and fuel feed tube 34, constitute the heat generating means for the reactor.

The fuel gas is any clean fuel to which sufficient water vapor has been added (if necessary) to prevent coking prior to its combustion. If the fuel contains a high carbon level, it will require some preheating to maintain the necessary humidity level without condensation.

A resistance heating coil 46 is used inside the outer shell wall or shell 12 of the reactor for cold starting the reactor. The resistance heater will preheat the adjacent zone to approximately 600° C. (which will be more or less, depending upon the specific fuel being used), at which point auto-ignition of the fuel and air can occur. It may be necessary to flow air through until preheating is complete when the gas can be introduced to produce ignition in flame zone 50. The exhaust from combustion tube 30 is collected in exhaust manifold 52 and passes out exhaust outlet 54 which is in communication with manifold 52.

The ceramic combustion tube 30 is preferably made from sintered alumina and can be made by any of the various available processes for making and shaping dense (impervious) ceramic bodies. Also, there is no criticality in the use of alumina and other ceramic compositions can be used. For example, U.S. Pat. No. 4,346,049 to J. A. Coppola et al. teaches a silicon carbide composition and process for producing sintered alpha silicon carbide ceramic bodies, the teachings of which are incorporated herein by reference, and such could be used to make the ceramic tube. Other ceramic compositions that could be employed include silicon nitride, aluminum nitride, sialon, or the like. The exact material preferred will depend upon the reactants and reaction products involved in the process, as well as temperature and pressure conditions.

The steel shell 12, bottom plate 16, top plate 18, manifolds 38 and 52, and outer plate 35 are preferably made of conventional pressure-vessel steel which is designed and rated for the reformer internal pressure of up 1200 psi or more and for temperatures of up to about 350° C. The refractory insulation 14 is preferably an erosion-resistant, low-conductivity type insulation such as an alumina composition with expansion joints used as required. The refractory should be rated for at least 1300° C. continuous duty.

Figure 2:
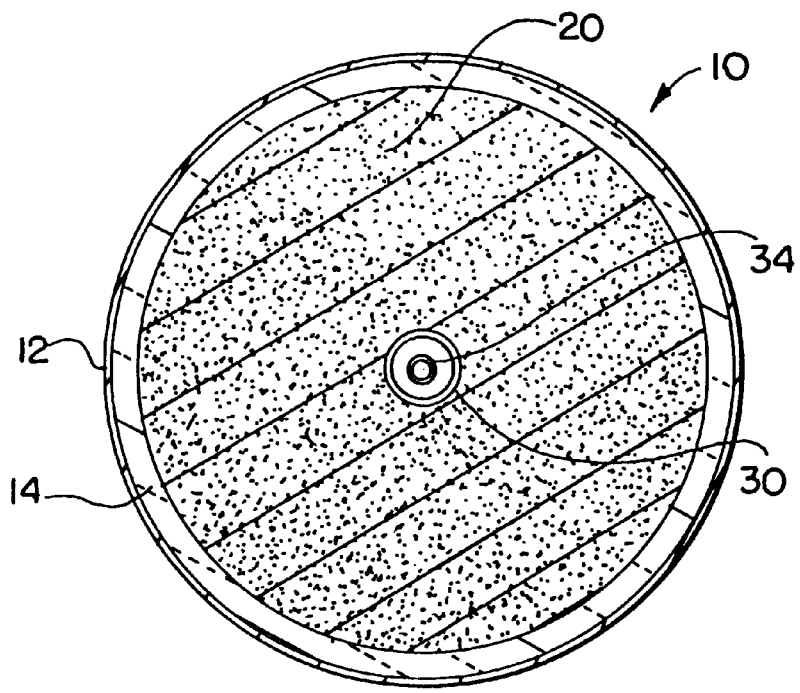
FIG. 2 is a cross sectional representation of the reforming apparatus of FIG. 1 taken along lines 2.

FIG. 2 shows a cross section of reformer 10 along lines 2—2 in FIG. 1. As can be seen fuel tube 34 is located concentrically within combustion tube 30 which in turn is surrounded by catalyst bed 20 inside insulated steel shell 12. The heat from combustion tube 30 will be transferred into catalyst bed 20 for effecting the endothermic reaction to reform the mixture of steam and light hydrocarbons. The use of external pressure surrounding the combustion tube 30 has the very significant advantage of placing the tube in a compressive stress state, where ceramics are much stronger than they are in tension.

Figure 3:
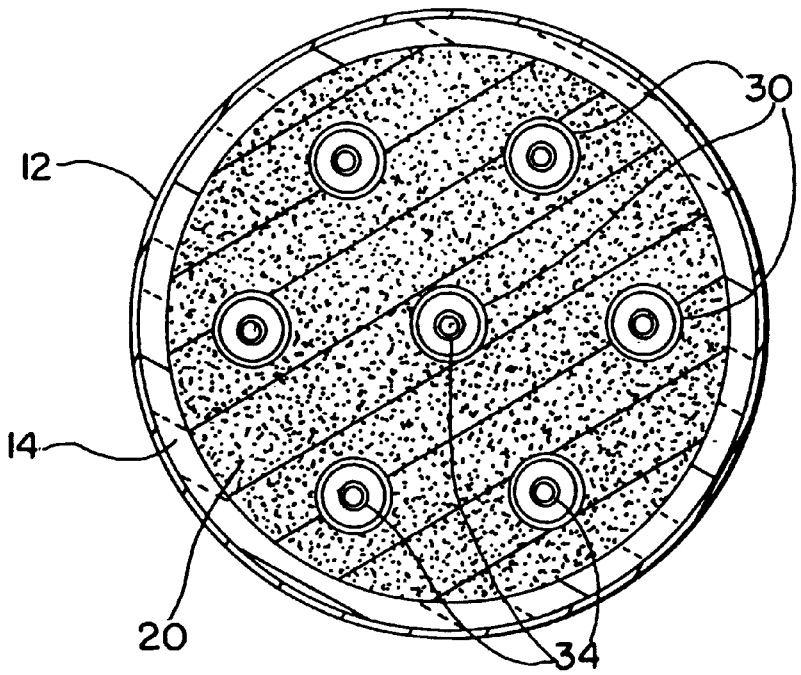
FIG. 3 is a cross sectional representation similar to FIG. 2 but showing another embodiment of the present invention.

As shown in FIG. 3, the design could consist of more than one burner tube with FIG. 3 illustrating seven burner tubes in an appropriate pattern. The invention is not limited to the use of one or seven, and is contemplated that as many as many thousands of combustion tubes could be incorporated in an appropriate size reformer apparatus. The use of small-diameter ceramic combustion tubes and graphite foil seals facilitates a denser packing of burner tubes than has been previously available in prior art apparatus.

The air supplied to inlet 40 could be supplied by a blower or a compressor depending upon the desired pressure drop, heat transfer requirements, and operation employed. A compressor will generate a higher inlet pressure than a blower, however, the cost of operating a blower would be less than operating a compressor. Also, it may be desirable to preheat the air fed to the heat generating means. Although no preheater is illustrated, such devices are known in the art and are commercially available. If desired, the exhaust flow could be expanded (with possibly some added heat) through a gas turbine to drive the air compressor.

Figure 4:
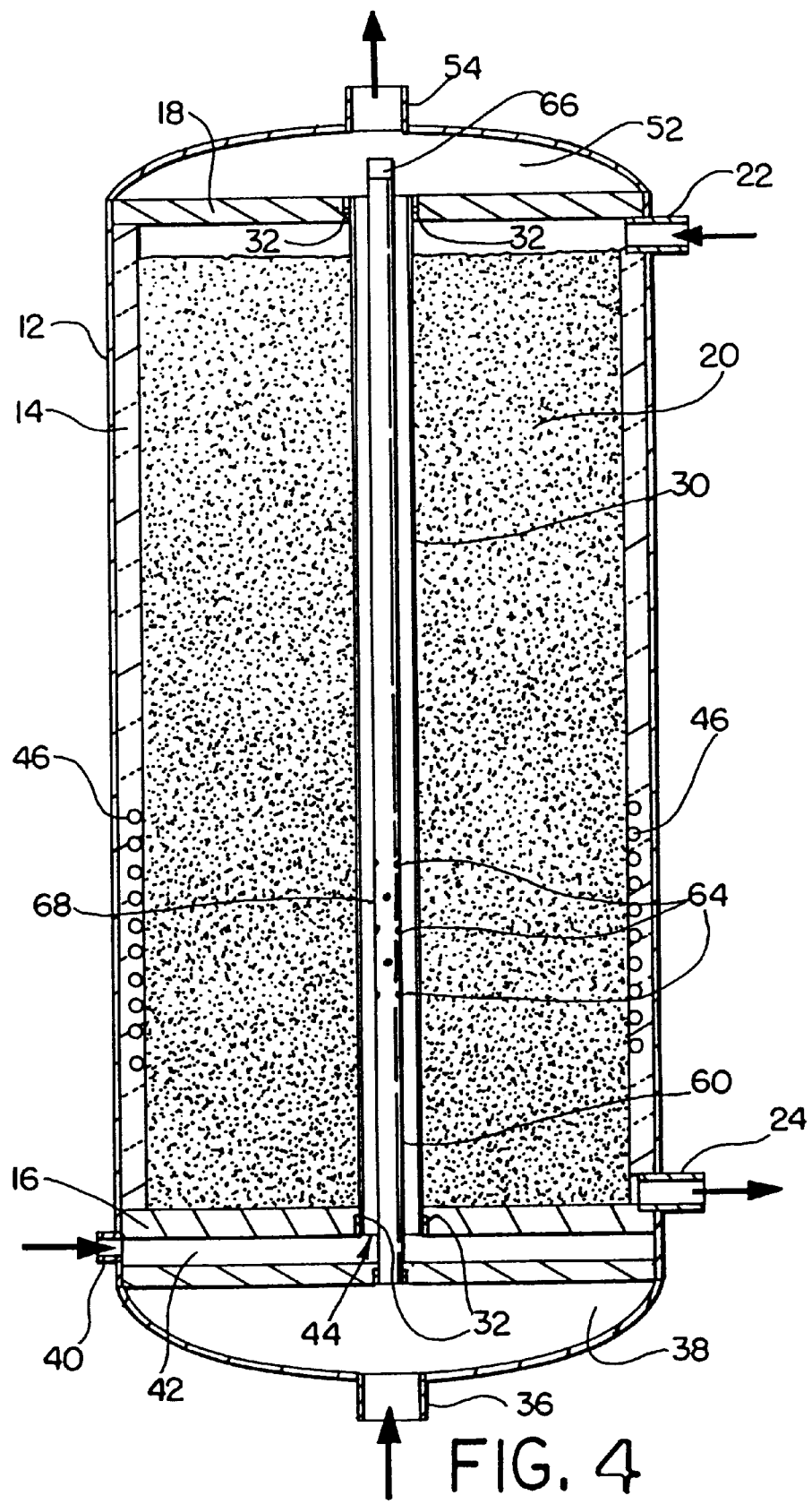
FIG. 4 is a cross sectional representation, similar to FIG. 1, of another embodiment of the invention which uses a perforated fuel feed tube.
Figure 5:
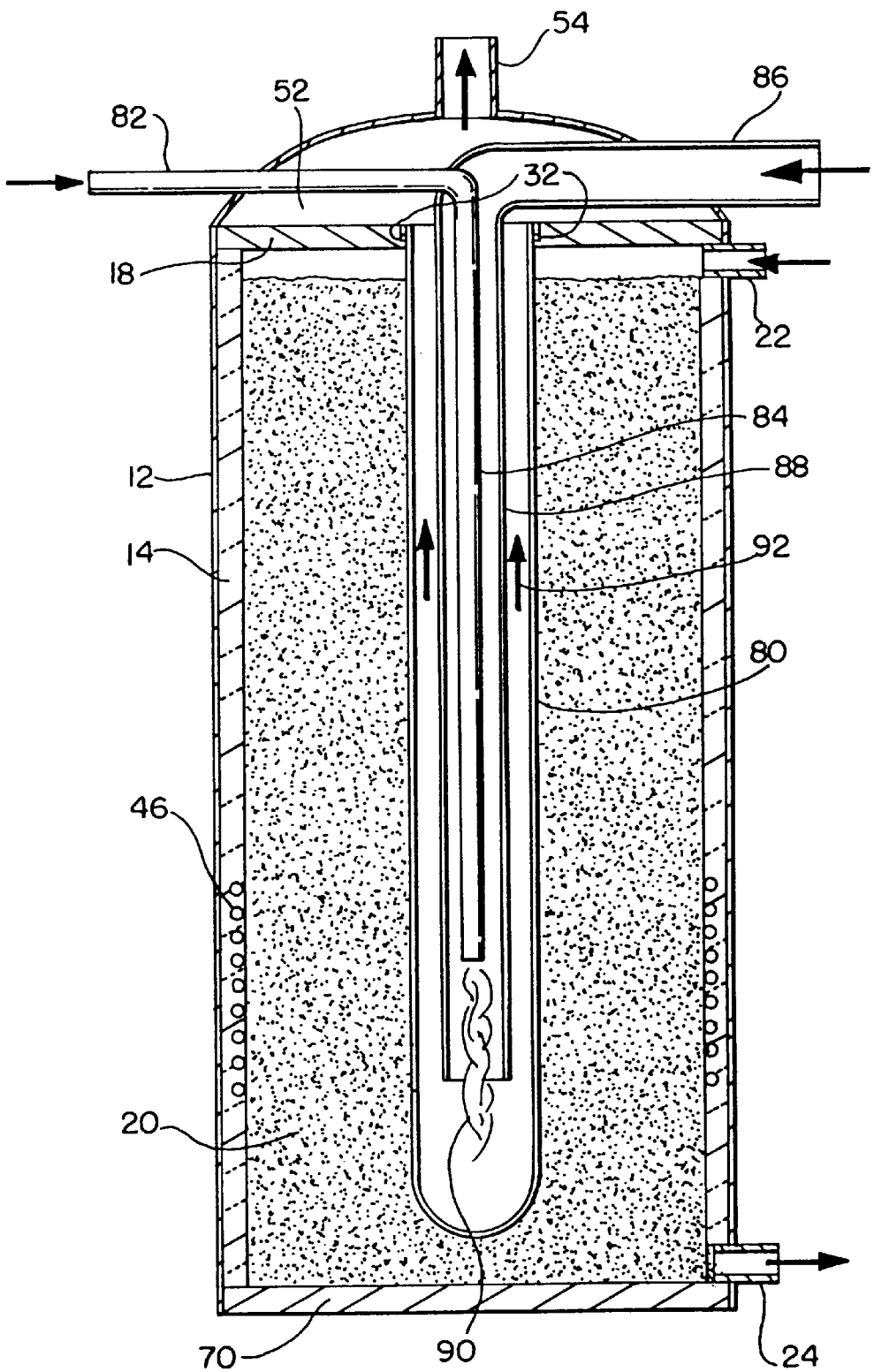
FIG. 5 is a cross sectional representation of yet another embodiment of the present invention, which uses a bayonet combustion tube.

The apparatus shown in FIGS. 4 and 5 are basically similar to that shown in FIG. 1 in that they include the shell 12, which contains a catalyst bed 20, and has feed inlet 22 and product outlet 24. The difference in these embodiments lies in the design of the heat generating means, although in each case, it is enclosed by the reaction vessel.

As shown in FIG. 4, combustion tube 30 has a feed gas tube 60 which has perforations or holes 64 at spaced intervals along its length and has one end 66 plugged or otherwise closed. In this way, fuel fed via inlet 36 into manifold 38 will pass down tube 60 until it exits via the perforations 64. When the reactor is at its operating temperature, the fuel will mix with the air fed via inlet 40 to manifold 42 and into the burner zone 68 and auto-ignite to heat the reactor. Note that plug 66 need not resist very hot temperatures and thus could be made of graphite or heat resistant organic cement. Other methods for the staged introduction of the fuel could also be employed.

The design in FIG. 5, differs in that the heat generating means is a bayonet type heat generating means. In this design, the tube sheet is replaced by an insulated vessel closure 70 and the combustion tube is a closed end tube 80 sealed to plate 18. The combustion tube is shown with a closed end but it could be a plugged design as shown in FIG. 4. The fuel is fed via fuel inlet 82 to fuel feed tube 84, while air is fed via air inlet 86 to air feed tube 88. At operating temperature, the fuel will auto-ignite in flame zone 90 to produce the heat for conducting the endothermic reaction. The exhaust gases will pass up combustion tube 80, as shown by arrow 92 to manifold 52 where they exit the apparatus via exhaust line 54.

In general, for the apparatus of this embodiment, the combustion tubes require a length to inside diameter ratio of typically 500 to 700 in order to achieve the required heat transfer per unit of flow volume for a natural gas plus steam reforming application. Even higher ratios are needed, if the reactor is to operate with low temperature differentials.

The preferred tube separation distance in this embodiment is quite small; for example 0.3 to 0.5 inches. It is limited by the required sizes of the seals and their associated threads and the need to have some small distance between these threads. Small distances lead to smaller vessel sizes and improved shell-side heat transfer.

The number of tubes in a single reactor could be as few as one to as many as 10,000 or more. Larger reactors will require thicker pressure-vessel walls, but will save on installation costs. The preferred tube wall thickness will depend upon tube strength, corrosion rates, and diameter. The use of external pressure will permit the use of relatively thin walls, since ceramics are much stronger in tension than compression.

The preferred combustion tube inside diameter is usually equal to the tube separation distance (expressed as inside tube to inside tube surface). Thus, if the separation distance were 0.4 inches, the preferred tube ID would be 0.4 inches for a centerline spacing of 0.8 inches. An equilateral triangular tube-arrangement is preferred for maximum packing density.

For example, one design could use 10,000 tubes, each 0.4 inch ID×0.5 inch OD×20 feet long on 0.8 inch triangular pitch. The bundle diameter would be about 7 feet and the total inside-surface area would be about 20,900 square feet.

The base-case design of this embodiment employs a fuel and air stream entering the reactor at the same end where the process gas exits and flowing countercurrent to the process gas, with the exhaust leaving at the opposite end, where the process feed enters.

Another variation would arrange cocurrent flow of combustion gases and process gases. This scheme would require a hot seal on the exhaust end of the ceramic tubes. Such a seal might be made of fused glass or a ceramic cement, for example. The cold-end seal could be an O-ring or graphite foil type to allow tube thermal expansion.

Closed-end, triple-concentric combustion tubes might be used, with the combustion gas exiting at the same end of the reactor where the air and fuel enter. This is illustrated in FIG. 5. The open ends of these concentric tubes might be at either the process feed or at the process exit end of the reactor.

The upper operating temperature of the graphite foil seals is limited by oxidation by the air present on one side. If a controlled very slow leakage of process gas is permitted to occur through the seal, this could sweep this air away from the seal material and permit the seals to exhibit long life at higher temperatures. Such an arrangement may be termed a purged seal condition.

The reactor maximum process temperature can vary widely, as required. However, if the auto ignition condition is to be maintained, reactors using maximum process temperatures below about 500° C. (depending upon the choice of fuel) will normally require the selection of one of the closed-end combustion tube variants. In these cases, the maximum process temperature could be as low as perhaps 100° C.

The combustion tubes might be made of various ceramics, depending upon the service conditions (temperature, corrosion, stresses, etc.). In addition to alumina, other possible materials for some applications would be carbide ceramics such as silicon carbide or other oxide ceramics such as mullite, stabilized zirconia, or the like. The use of external pressure will be a major advantage in controlling the combined stresses in the ceramic tubes to acceptable levels. Still other materials are also possible, such as metal tubes for lowertemperature applications.

If the fuel chosen is a mixture of a hydrocarbon (such as natural gas) plus steam, a reforming catalyst might also be positioned within the tube 34 to cause the fuel to partially reform during its heatup and hence to both absorb more heat from the process gas (improving cooling) and to simultaneously increase the heating value of the fuel gas (improving heating).

The following example is presented to illustrate the operation of an apparatus in accordance with Ceramic Tube Embodiment of the present invention and the advantages of very high temperature operation in producing syngas of superior composition. Modifications of the physical dimensions will alter the operating parameters and so adjustments may be necessary to achieve the same results.

Figure 6:
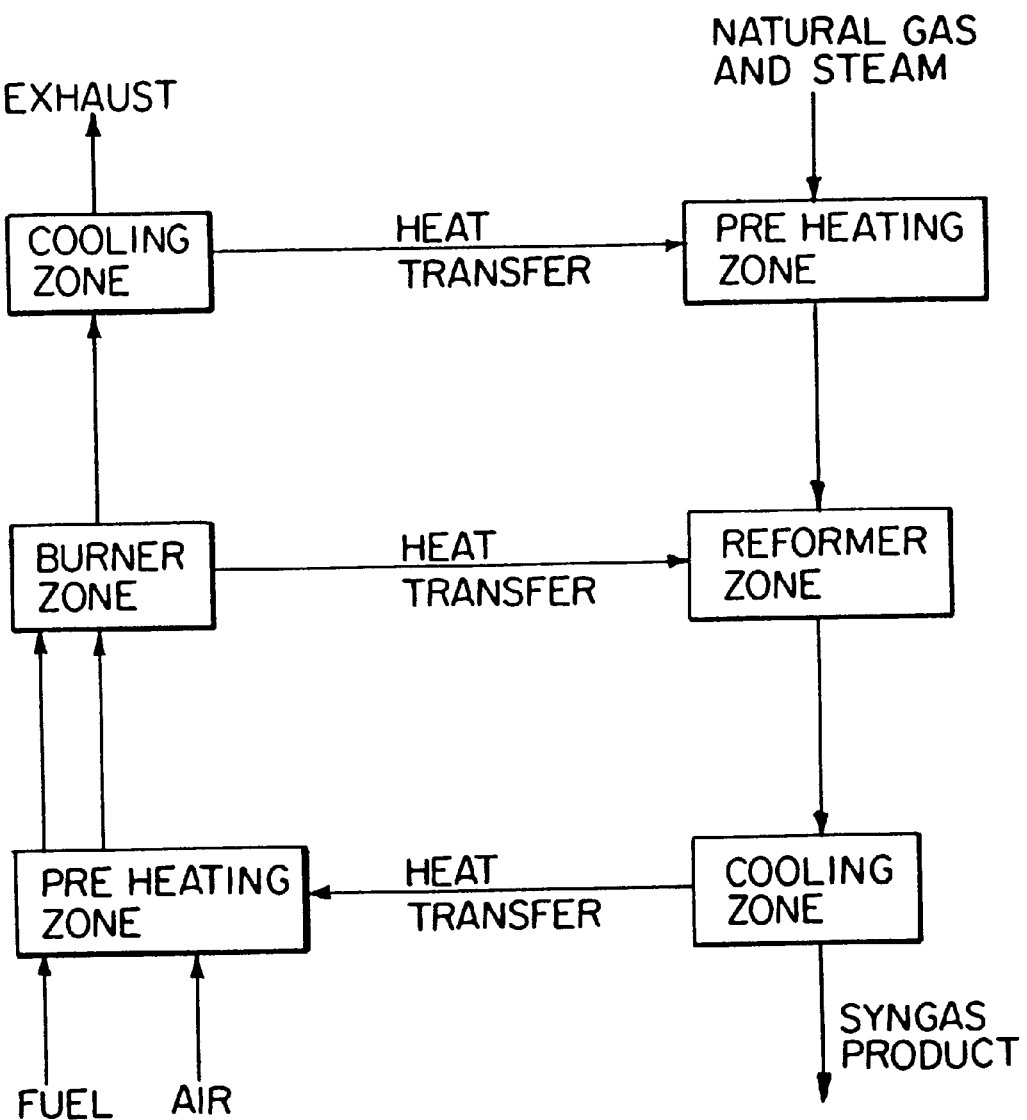
FIG. 6 is a block diagram of a methane reforming process which illustrates the present invention.

The flow diagram shown in FIG. 6 is presented to help understand the example presented here end the various parameters involved in the process of the present invention.

EXAMPLE 1

A feed containing 2.5 volumes steam plus 1.0 volume natural gas, (with an assumed composition of 90 volume percent $CH_4$, 7% $C_2H_6$, 2% $N_2$, and 1% $CO_2$) is passed through either a conventional reformer or this invention. The conventional reformer is similar to that described by Dwyer et al. (U.S. Pat. No. 3,132,010) with a hot-zone reaction pressure of 155 psia, whereas the example of this invention uses 1070 psia for this pressure. The computed syngas compositions listed in Table 1 are based upon thermodynamic equilibrium compositions at the above pressures and at temperatures 20° C. below the stated Table 1 peak temperatures. The compositions are tabulated after condensing water to 40° C.

TABLE 1

Computed Syngas Compositions

| | Conventional Radiant Reformer | This Invention |
|---|---|---|
| Reformer Peak Temperature (° C.) | 850 | 1170 |
| Dried Syngas Pressure (psia) | 140 | 1140 |
| Dried Syngas Composition (mole %) | | |
| $H_2$ | 72.49 | 74.13 |
| CO | 15.97 | 20.56 |
| $CO_2$ | 6.83 | 3.77 |
| $CH_4$ | 3.60 | 0.96 |
| $N_2$ | 0.50 | 0.48 |
| $H_2O$ | 0.61 | 0.10 |
| Volume Dried Syngas/Volume Nat. Gas | 3.98 | 4.15 |
| Percentage Methane Conversion | 84.1 | 95.6 |

Based upon data from Table 1, the advantages of the apparatus of the present invention are that the syngas pressure is much higher, thus eliminating or reducing the need for syngas compressors, the methane conversion percentage is much higher, the syngas $CO/H_2$ ratio is much higher, and the syngas $CO/CO_2$ ratio is much higher.

The new process may, if desired, be operated at still higher temperatures to obtain still higher methane conversions, $CO/H_2$ ratios, and $CO/CO_2$ ratios. It may also be operated at either higher or lower pressures and/or steam ratios. The ceramic tubes are less prone to coking than are metallic tubes under conditions of low steam ratios.

The new invention allows very high rates of heat transfer per unit of reactor vessel volume. For example, the average rate of heat exchange between the process gas and the air/fuel/exhaust flow was calculated to be some 7 $MW/m^3$ for the reformer internal volume for a reformer design in accordance with the present invention and based upon the stated example, and this figure is more than a factor of ten above the corresponding value for a typical radiant reformer.

Metallic Reaction Tube Embodiment

Figure 7:
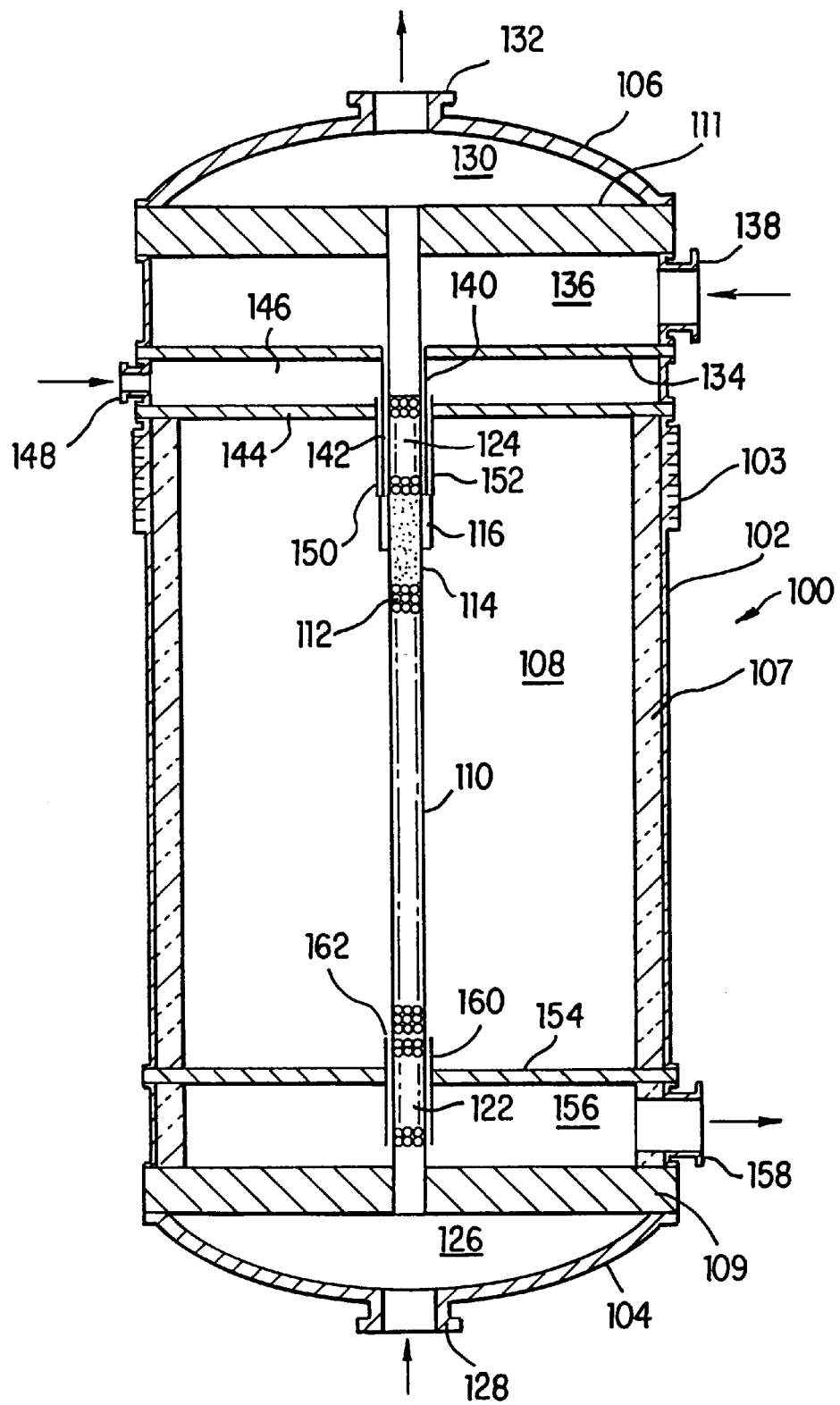
FIG. 7 is a cross-sectional representation of still another embodiment of the invention.

As shown in FIG. 7, the inventive reaction apparatus of this embodiment, generally indicated at 100, comprises an elongated vessel 102 with expansion joint 103 (e.g. a metal bellows) and defining a first end or "head" 104 and second end or head 106, ceramic fiber insulation 107 and an interior 108. For cold starts, an external burner (not shown) is employed to preheat the incoming air to a temperature on the order of 550° C. in order to preheat the reactor to above autoignition temperatures. This burner is shut off following the fuel ignition.

Within interior 108 is an endothermic reaction tube 110 which is secured to end plates or "tube sheets" 109 and 111 by suitable seals such as, for example, welding (not shown). As can be seen from FIG. 7, tube sheets 109 and 111 are rigidly secured to the walls of vessel 102 so that the tube sheets are not axially moveable in said vessel relative to the portion of the vessel to which they are attached, this being known in the art as a "fixed tube sheet design." Furthermore, in the specific embodiment described there is no support structure, such as rods or baffles, on the shell side of the vessel interior to support reaction tube 110 at an intermediate position (i.e. at a position intermediate its two ends) as is used in conventional designs to prevent lateral movement of the tube and hence buckling under various compressive loads.

The inside of reaction tube 110 defines an endothermic reaction flow path for carrying out the endothermic reaction, while the volume outside of reaction tube 110 defines a combustion flow path for carrying out combustion. Reaction tube 110 is filled with an endothermic reaction catalyst 112 of a suitable shape and size. In the embodiment shown, catalyst 112 is composed of spheres approximately 5 mm in diameter. In order to foster heat transfer and thereby reduce thermal degradation of reaction tube 110, endothermic catalyst 114 contiguous to combustion zone 116 is smaller in size, for example 3 mm in diameter. Inert material 122 and 124 is provided on either side of endothermic catalyst 112/114, also to improve heat transfer.

Head 104 and tube sheet 109 together define an inlet manifold 126 for receiving endothermic reactant feed from inlet 128. Head 106 and tube sheet 111 together define an outlet manifold 130 for discharging endothermic product through outlet 132.

Air header 134 together with tube sheet 111 define air manifold 136 for receiving air from inlet 138. Air tube 140, which is concentric with reaction tube 110, communicates with air manifold 136 for charging air into combustion zone 116 via annulus 142. Fuel header 144 together with air header 134 define fuel manifold 146 for receiving gaseous fuel from fuel inlet 148. Fuel tube 150, which is also concentric with reaction tube 110 and air tube 140 communicates with fuel manifold 146 for supplying fuel to combustion zone 116 via fuel annulus 152. Combustion gas header 154 together with tube sheet 109 define combustion gas manifold 156 for discharging combustion gas produced by the combustion of fuel and air in vessel interior 108 through combustion gas annulus 162, which is formed by reaction tube 110 and discharge pipe 160 concentric therewith, and combustion gas outlet 158. As shown in FIG. 1, air tube 140 and fuel tube 150 are so configured that combustion zone 116 is located in the interior of vessel 102 and, as further described below, spaced far enough away from the reaction and combustion gas outlets so that both the endothermic product gases and the combustion product gases will be considerably cooled before exiting the vessel.

In operation, once steady-state has been reached, endothermic reactant, such as a mixture of methane and water vapor, is charged into inlet 128, endothermic product is withdrawn from outlet 132, fuel and air are charged into fuel inlet 148 and air inlet 138, respectively, and combustion gases are withdrawn from combustion outlet 158. This sets up a countercurrent flow between the reaction gases flowing through combustion tube 110 and the combustion gases flowing through interior 108 of vessel 102. The flow rates of the various reactants and products and the size and shape of the various tubes are so selected that when air and fuel are mixed in combustion zone 116 they will be at or above their autoignition temperature. By this means, they will mix, ignite and combust without the need for a separate igniter such as a glowplug, sparkplug or the like. Countercurrent flow of the endothermic reactant gases and combustion gases also tends to improve heat transfer between the reactant gases and combustion gases on opposite sides of the reaction tube walls. This in turn minimizes hot spots and leads to a longer useful life of the tubes.

Figure 8:
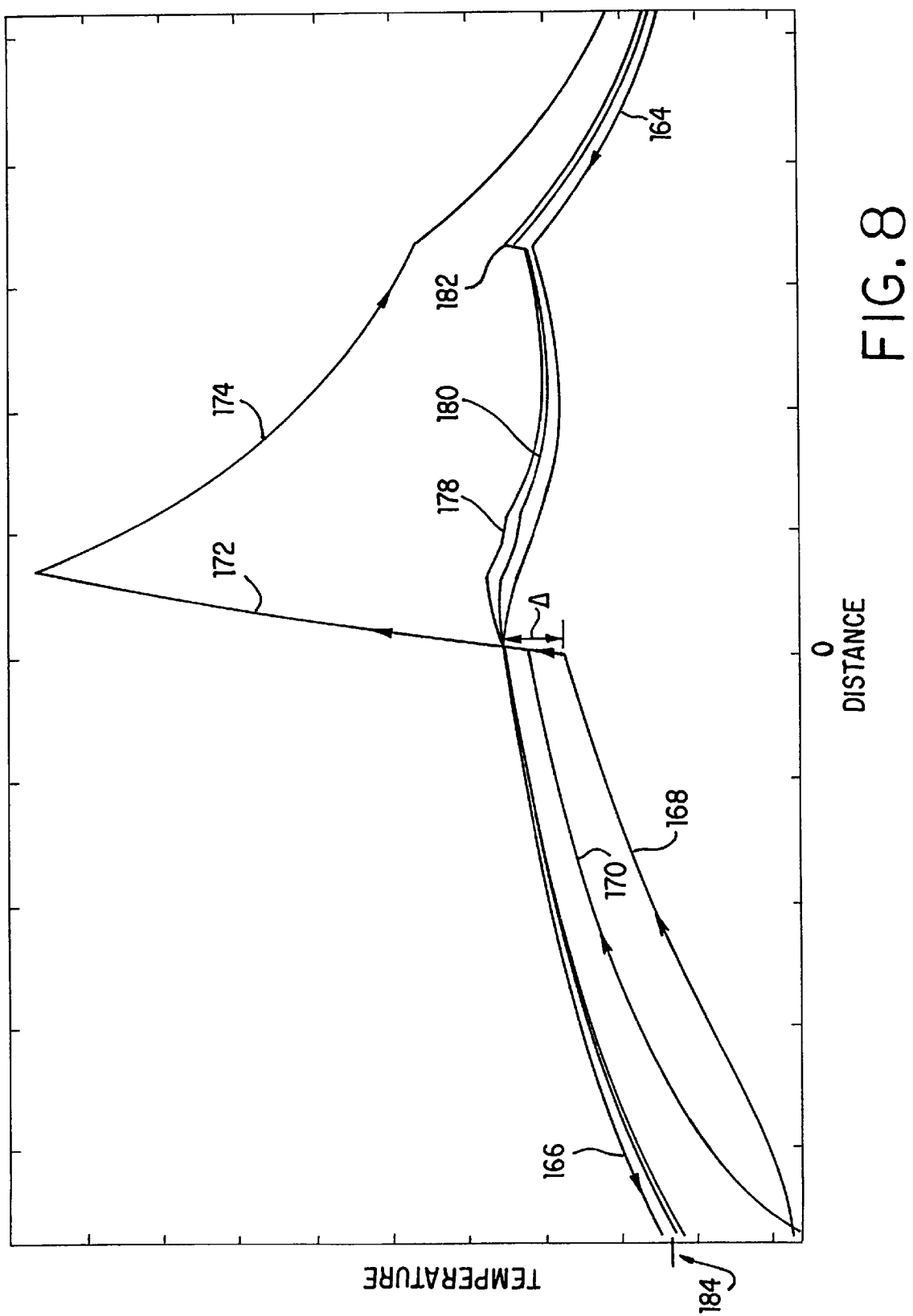
FIG. 8 is a graphic representation of the temperature profiles of reaction and production gases as well as the combustion tube wall of the apparatus of FIG. 7 when in steady-state operation.

This beneficial effect is illustrated in FIG. 8 which is a graphic representation of the temperature of various process gases as well as the tube wall surfaces of reaction tube 110 of the apparatus of FIG. 7. In FIG. 8, the abscissa is a measure of the distance from combustion zone 116, with zero being taken as the start of combustion zone 116. The ordinate is a measure of the temperature of the various gases and tube wall being measured. In this figure, 164 indicates the endothermic reactant temperature profile, 166 indicates the endothermic product temperature profile, 168 the fuel temperature profile, 170 the air temperature profile, 172 the flame temperature profile, 174 the combustion gas temperature profile, 178 the reaction tube outside wall temperature profile and 180 the reaction tube inside wall temperature profile. 182 indicates the boundary between inert 122 and endothermic catalyst 112, while 184 indicates the autoignition temperature of the fuel/air combination.

As can be seen from the figure, even though the flame temperature of the combusting gases reaches a very high level, the inner and outer tube walls of reaction tube 110 stay relatively low, thereby remarkably prolonging the useful life of these tubes and enabling metallic rather than ceramic tubes to be used in high temperature applications. At the same time, the various gases exiting the device, both the endothermic product gases and the combustion gases, are cooled to reasonable temperatures while inside the inventive furnace, the combustion gases are heated to above their autoignition temperatures and at the same time sufficient heat is provided to the endothermic reactants to drive the desired endothermic reaction. Also, the problem of high thermal stress, which can sometimes be experienced with ceramic tubes, has been avoided.

As more fully described below, the design features appropriate for this metallic reaction tube embodiment of the invention are the same as, or similar to, those described above for the ceramic tube embodiment. However, for this embodiment, it is preferred that the tube separation distance in the case of a multitube design be quite small. Preferably, the centerline spacing between adjacent tube groups (i.e. feed tube 150, air tube 140 and reaction tube 110) is 1.25 times the outside diameter of feed tube 150. Small distances lead to smaller vessel sizes. Also, tubes made from ceramics or other materials instead of metals can be employed in this embodiment as well. However, metallic tubes are preferable to ceramic tubes in this embodiment due to their greater availability in long length to diameter ratios, ductility, ease of sealing (by welding), reliability, lower cost, and thermal stress resistance.

The inventive reaction apparatus of this embodiment is ideally suited for large-scale operations such as the commercial production of synthesis gas by the steam reforming of gaseous hydrocarbons, especially methane. Steam reforming reactions are favored by higher temperatures, such as for example 800 to 1000° C., more preferably 870 to 920° C., while most downstream uses of syngas, for example methanol synthesis and Fischer-Tropsch synthesis, are favored at high pressures, such as for example at least 10 atm, preferably 20 to 60 atm, more preferably 30 to 50 atm. Therefore it is desirable to operate at these high pressures, at least on the shell side, and high temperatures when carrying out this type of reaction.

Large-diameter reaction tubes intended for large-scale furnaces to be operated at these high temperatures and pressures, whether such tubes are made from ceramic or the expensive metal alloys needed to withstand such high temperatures, require very thick walls and exhibit poor temperature profiles internally. They are also very expensive. Therefore large-scale furnaces intended to carry out steam reforming at these high temperatures and pressures must be made from a large number of long, small diameter closely-packed tubes to be economic. Close packing of a large number of small diameter tubes is made possible by the present invention in this embodiment because the tubes are metal, the reaction occurs inside the tubes and the autoignition of combustion gases eliminates the need for igniters and/or flame holders to assure stable combustion flames. The absence of a tube support structure inside the vessel on the shell side, which is a preferred but not mandatory feature of this embodiment, also helps.

In this connection, it is important to note that when the apparatus of this embodiment is operated with a pressure higher than atmospheric on the tube side, such as in an integrated process involving methane reformation as a first step followed by further downstream high pressure processing, the tubes will be kept in tension. This is because the pressure on the tube side creates an axial force tending to push headers 104 and 106, and hence inlet and outlet manifolds 126 and 130, apart and further because expansion joint 103 prevents the walls of vessel 102 from providing any countervailing tensile force. Tension on the tubes is an important feature of this embodiment of the invention because the tubes, especially when long, thin tubes are used as is necessary for economic operation, have comparatively little strength in compression and therefore any significant compressive load, axial or lateral, would render the tubes unserviceable through buckling and distortion. Tension on the tubes, however, gives the tubes added strength to avoid the buckling problem, and thereby allows the tubes to be made thinner and hence cheaper.

Moreover, at the high temperatures encountered in most endothermic reactions, the tubes will inherently undergo creep, i.e. high temperature deformation, primarily in the axial direction. For example, it is estimated that tubes approximately 25 feet in length will undergo an elongation of approximately 3 inches in a typical methane reforming environment. Axial creep deformation of the tubes allows the tubes to automatically distribute the axial load evenly among all the tubes, which is quite different from conventional fixed tube sheet shell and tube heat exchangers in which tubesheet bowing causes the axial loads in the tubes to vary considerably across the tubesheet. This automatic distribution of the axial load evenly across the tubes contributes to the longer useful life of the apparatus as a whole, since it avoids early failure of tubes subjected to disproportionately higher axial loads as would occur in prior art designs.

Thus, in a preferred mode of this embodiment, the present invention provides combustion furnaces having at least 100, preferably at least 500, more preferably at least 1,000 or even 5,000 combustion tubes, each having an inside diameter to length ratio of 50 to 1000, preferably 150 to 500, more preferably 250 to 350.

In particular, the present invention is ideally suited for the design of large volume, high capacity furnaces having at least 100 combustion tubes, each with a length to internal diameter ratio of at least 100. Such furnaces are suitable for high temperature (at least 850° C.) and high pressure (at least 10 atm) operation. More preferred are furnaces having at least 500 combustion tubes each with a length to internal diameter ratio of at least 200. Even more preferred for high volume operations are furnaces having at least 1,000 tubes, each with a length to internal diameter ratios of at least 250. These latter furnaces are especially useful for high volume operations carried out at elevated pressures, e.g. at least about 500 psi and elevated temperatures, e.g. at least about 875° C.

The following example is provided to more thoroughly illustrate the metallic reaction tube embodiment of the present invention:

EXAMPLE 2

A feed of the composition shown below is supplied to the FIG. 7 apparatus at 350° C. and at the pressure and flowrate shown. The product gas composition was computed based upon chemical equilibrium thermodynamics at approximately 893° C. and 522 psia. The product exit temperature is 490° C. The air feed rate is 2139 kmol/hr at 120° C. and 131 psia. The fuel gas contains 82% $H_2$, balance several other gases. The fuel and air preheat temperatures are near 850° C. and the exhaust temperature is about 495° C.

| Mole % | Feed Gas | Product Gas |
|---|---|---|
| $H_2$ | 1.19 | 45.28 |
| CO | — | 14.93 |
| $CO_2$ | 8.18 | 5.66 |
| $CH_4$ | 30.86 | 6.86 |
| $N_2$ | 6.29 | 4.35 |
| $H_2O$ | 53.57 | 22.90 |
| Pressure (psig) | 638 | 508 |
| Flow Rate (kmol/hr) | 3222 | 4583 |

| | |
|---|---|
| Reformer peak process temperature: | 900° C. |
| Combustion Tube Count: | 1700 |
| Combustion Tube Inside Diameter: | 19.8 mm |
| Combustion Tube Overall Length: | 7260 mm |
| Combustion Tube Length/Diameter: | 367 |

This shows that high methane conversions to syngas can be achieved at desirable high pressures and also at temperatures low enough to accommodate many commercially available high temperature alloys. This means that the inventive furnace can be made with metal, rather than ceramic tubes, and that these metal tubes will give long useful lives even though used to provide high conversion of methane to syngas at high pressures.

General Description Applicable to Both Embodiments

Determining the best design and operating conditions of the inventive furnace for a particular application depends on many factors as discussed below. For example, steam-methane reforming (and most of the other endothermic reactions of interest here) is favored by high temperatures and by low pressures. However, most applications for the product syngas require that the syngas be at high pressure. The use of compressors to compress syngas is very expensive in both capital and energy.

This invention makes it practical to produce syngas at any desired pressure up to about 60 atm with metallic tubes and up to 100 atm or more with ceramic tubes. The preferred pressure would be the lowest needed for the subsequent uses of the product gas which, of course, means that the syngas compressor needed in prior. art arrangements can be totally eliminated.

The pressure of the air, combustible fuel and combustion products in the combustion flow path can be ambient as is conventional. Where the endothermic reaction is carried out at elevated pressure, however, it is desirable to maintain the pressure of the combustion gases at a higher pressure, for example 2 to 10 atmospheres or more, since this reduces stresses on the reaction tubes and thus enables the reaction tubes to be thinner.

The preferred inside diameter to length ratio of the combustion and reaction tubes depends upon the embodiment selected, the approach temperatures desired, and the allowable gas pressure drops in the particular application. For example, the FIG. 1 embodiment will typically employ an L/D ratio of 400 to 600 while the FIG. 7 version will preferably employ an L/D ratio of 250 to 350.

The preferred inside diameter of the combustion and reaction tubes is relatively small, for example 5 to 50 mm, preferably 15 to 30 mm, for economic reasons, although tubes of any inside diameter could be used. A small diameter requires a thinner wall than a larger diameter for the same temperature and differential pressure and is hence less costly. If the tubes are too small however, the tube count will become very large and costs will rise again. Also, very small diameters may cause catalyst packing problems for designs having catalyst inside the tubes, leading to locally poorer heat transfer. For the ceramic tube embodiment in which combustion occurs inside the combustion tubes, very small diameters cause enhanced flame-zone heat transfer, which may cause excessive wall temperatures. Larger tubes will exhibit unfavorable radial temperature gradients.

In determining the preferred tube count, a choice must be made between a single very large reactor and multiple smaller reactors, especially for industrial processes intended to treat very large volumes of process gas. In general, there are few overall cost advantages in using more than several thousand tubes in a single reactor. The preferred minimum tube count is that needed to process the required throughput of gas. Using the FIG. 7 embodiment with a reaction tube inside diameter of 0.8 inches, the synthesis gas production per tube in one example was about 2.7 kg-moles/hour.

Preferred metal alloys for use in the inventive reaction furnace must have high hot strength (resistance to creep and creep rupture) and high resistance to both oxidation and to process gas corrosion. Among the alloys suitable for typical applications are various nickel-based, high-temperature alloys. For example, if the inventive reaction furnace is intended to be used for steam reforming of methane high temperature nickel-based alloys containing chromium, tungsten and molybdenum, such as Haynes® 230 (22% Cr, 14% W, 2% Mo balance Ni) available from Haynes International, Inc. of Kokomo, Ind., are preferred. If desired, metal tubes can be provided with suitable coatings to prevent metal dusting and other forms of attack. Such coatings are well-known in the art, alonizing being a specific example.

The preferred peak process temperature depends upon the pressure chosen, the tube material, the feed mixture composition, and the requirements of external processes. It is often desirable to operate at the highest temperature which will give acceptable tube life under the chosen conditions. In these cases, ceramic tubes might be operated at peak process temperatures from about 1050° C. to as high as 1200° C, whereas metallic tubes may preferably be operated in the range of about 850° C. to 1000° C. In other cases, a superior process heat balance and overall cost savings will be obtained at somewhat lower temperatures than the above, with the preferred peak process temperature for metallic tubes then being about 875 to 925° C.

In a particularly preferred embodiment of the invention, the inventive reaction furnace is designed and operated so that during steady state operation the difference between the temperature to which the fuel and air are heated prior to mixing in the combustion zone and the maximum endothermic reaction temperature, which is indicated by temperature difference $\Delta$ in FIG. 8, is less than 200° C. Preferably this difference is 50 to 100° C. Since most of the common gaseous fuels autoignite with air at temperatures of about 400 to 450° C., and since most endothermic reactions of interest here occur at approximately 850° C. to 950° C., this means that in normal operation according to this preferred embodiment the air and gaseous fuel will be heated to significantly (400 to 500° C.) above its autoignition temperature before being combined in combustion zone 116. This extensive heating results in extensive cooling of the endothermic product gases.

In the same way, it is desirable to design and operate the furnace so that the combustion product gases are cooled significantly before exiting the furnace. By proper design and operation of the furnace, it is possible to insure that both the combustion and product gases exit the furnace at moderate temperatures, for example below 500° C. This provides high thermal efficiency and moderate temperatures of connecting piping and equipment.

The present invention can be used to carry out a wide variety of different endothermic reactions such as steam reforming of light hydrocarbons, especially methane, ethane and natural gas, the pyrolysis of alkanes such as ethane and propane to their corresponding alkenes, ethylene and propylene, the water-gas shift reaction, and so forth. Such processes are well known in the art.

Some of these processes can be carried out without a catalyst while others require or usually employ a suitable catalyst. Where a catalyst is used, it should maintain sufficient activity over a long period of time at the high bed temperatures encountered herein. It should be strong enough to support the bed weight above it. It should have a particle size which is small enough to properly fill the spaces between the tubes but large enough to minimize pressure drop through the bed to an acceptable value. It should not sinter-bond excessively to itself or to the tubes upon long exposures at the high temperatures. A suitable form of nickel on alumina is one possible candidate, but other catalysts are also reported to be suitable.

For hydrogen production, either a high-temperature shift catalyst and/or a low-temperature shift catalyst can optionally be placed within the reactor in the zone where the process gas is cooling and this will cause most of the CO to react with excess $H_2O$ to form more $H_2$ with $CO_2$ as a byproduct (the so-called "water-gas shift" reaction).

Many modifications clan be made of the preferred embodiments of the invention as described above. For example, the gaseous fuel and air flow paths could be switched, if desired. Also, these flow paths need not be annuluses concentric with the reaction tubes as shown but may be any arrangement which allows the fuel and air to be separately heated to above the autoignition temperatures before being combined in the combustion zone. Also, a separate heat generating means for each reaction tube is not needed either, it being sufficient that enough heat is supplied from one or more heat generating means in the interior of the furnace to drive the endothermic reaction. In addition, the combustion gases, on the one hand, and the endothermic reaction gases, on the other hand, could be made to flow cocurrently, rather than countercurrently, if desired.

Still other modifications are possible. For example, the process fluid stream could be of many different types, including gases, boiling liquids, liquids, or slurries containing fine solids. Gas to liquid condensation might also desirably occur in the coolest zone of the reactor. In addition, cold reactor preheat for start-up could be achieved alternatively by other means than an electric resistance heater. For example, hot combustion gases could be introduced through supplementary nozzles in the reactor and circulated through the desired region. Also, many different types of thermal insulation might be used inside the pressure vessel. In addition, the maximum temperature of the combustion gases within the combustion tubes of the ceramic tube embodiment and outside the tubes in the metallic reaction tube embodiment may be varied by adjusting the fuel composition and the fuel and air flow rates. Increasing the air flow rate progressively above the stoichiometric ratio will progressively lower the maximum local temperatures. Steam additions to the fuel can also reduce maximum temperatures.

Finally, if syngas is desired for ammonia synthesis, an appropriate (usually small) proportion of compressed air may be added to the natural gas and steam, such that the product syngas will contain the desired ratio of $H_2$ to $N_2$ (usually 3:1). This air addition will react in the catalyst bed during heatup, but will be low enough so as not to produce an excessive local temperature rise in the bed. The overall reaction will remain endothermic. This method for making ammonia syngas does not require the addition of any oxygen aside from the air itself, which is a desirable cost savings versus some competing processes which require the separation of oxygen from the air.

All such modifications are intended to be included within the scope of the present invention, which is to be limited only by the following claims.

What is claimed is:

1. An endothermic reaction apparatus for effecting an endothermic reaction, comprising a vessel, said vessel including an inlet port for an endothermic reactant to be subjected to an endothermic reaction to convert the reactant to an endothermic product, an outlet port for the endothermic product, and an exothermic reaction chamber between the inlet and outlet ports along the flow path of the endothermic product, a plurality of reaction tubes providing flow passages between said inlet and outlet ports, said reaction tubes extending through said exothermic reaction chamber from a downstream end to an upstream end of said exothermic reaction chamber, first and second supply passages for separately supplying first and second exothermic reactants to said exothermic reaction chamber for exothermically reacting within said exothermic reaction chamber and for providing flow of exothermic reaction products in a direction going from said upstream end to said downstream end of said exothermic reaction chamber, said first and second supply passages passing through a preheating zone within said vessel wherein heat is transferred to said exothermic reactants from said endothermic reaction product for preheating the exothermic reactants prior to mixing and exothermically reacting and for cooling said endothermic reaction product, and a plurality of feed tubes respectively associated with said reaction tubes and disposed to produce an annular shroud of flame around each reaction tube, said feed tubes each having an outlet end located at said upstream end of said exothermic reaction chamber and oriented to direct at least one of the exothermic reactants exiting therefrom in a direction substantially parallel to said reaction tubes such that the annular shroud of flame is directed countercurrent to the flow of the endothermic reaction product.

2. The endothermic reaction apparatus of claim 1, wherein said first and second supply passages pass through said preheating zone in such a manner that said exothermic reactants are heated sufficiently so as to autoignite when mixed together in said exothermic reaction chamber.

3. The endothermic reaction apparatus of claim 1, including an endothermic reaction catalyst in said reaction tubes.

4. The endothermic reaction apparatus of claim 1, including a plurality of supply tubes, said supply tubes and respective reaction tubes being disposed one inside the other and forming therebetween said first and second supply passages.

5. The endothermic reaction apparatus of claim 1, wherein said reaction tubes each has a downstream portion disposed downstream of said exothermic reaction chamber in the direction of flow of endothermic product to said outlet port, and wherein there is provided a plurality of first supply tubes through which said downstream portions of said reaction tubes coextend, said first supply tubes and respective reaction tubes forming therebetween one of said first and second supply passages in heat exchange relationship with said downstream portions of said reaction tubes.

6. The endothermic reaction apparatus of claim 5, including a plurality of second supply tubes through which said first supply tubes respectively coextend, and said first and respective second supply tubes forming therebetween another of said first and second supply passages in heat exchange relationship with said one of said first and second supply passages.

7. The endothermic reaction apparatus of claim 1, wherein said reaction tubes are straight and parallel.

8. The endothermic reaction apparatus of claim 1, wherein said inlet for the endothermic reactant is at a first end of said vessel, said outlet for the endothermic reaction product is at a second end of said vessel opposite said first end, said vessel includes first and second inlets located at said second end of said vessel and respectively connected to said first and second supply passages, and an exhaust outlet located at said first end of said vessel and connected to said downstream end of said exothermic reaction chamber.

9. The endothermic reaction apparatus of claim 1, wherein said vessel is elongated and said reaction tubes and said exothermic reaction chamber extend longitudinally through said vessel.

10. The endothermic reaction apparatus of claim 1, comprising means for causing the exothermic reaction products exiting from said exothermic reaction chamber to flow around and along an upstream portion of each reaction tube located at the downstream end of the exothermic reaction chamber at a velocity substantially greater than the velocity of the exothermic reaction products through said exothermic reaction chamber to enhance heat transfer from said exothermic reaction products to said upstream portion of each reaction tube for heating the endothermic reactant flowing through said upstream portion of each reaction tube, said means for causing including an exhaust tube through which said upstream portion of the respective reaction tube coextends, said exhaust tube and upstream portion of the reaction tube forming therebetween an exhaust passage for the exothermic reaction products.

11. The endothermic reaction apparatus of claim 1, wherein said vessel includes an inlet manifold connected to said inlet port and an outlet manifold connected to said outlet port, and said reaction tubes provide respective flow passages between said inlet and outlet manifolds, said reaction tubes extending through said exothermic reaction chamber in laterally spaced apart relationship.

12. The endothermic reaction apparatus of claim 11, wherein said first and second supply passages include a plurality of supply passages having respective first and second fluid outlets disposed around said reaction tubes for introducing said first and second exothermic reactants into said exothermic reaction chamber.

13. A process for carrying out an endothermic reaction in an endothermic reaction apparatus in which an endothermic reactant is heated by exothermic reaction of two exothermic reactants to thereby convert the endothermic reactant into an endothermic product, comprising causing the endothermic reactant to flow through a plurality of reaction tubes wherein the endothermic reactant is to undergo the endothermic reaction, the reaction tubes extending through an exothermic reaction chamber of a vessel from a downstream end to an upstream end of said exothermic reaction chamber, removing the endothermic reaction product from said vessel after flow through said reaction tubes, separately supplying first and second exothermic reactants to said exothermic reaction flow path for reacting within said exothermic reaction chamber with the exothermic reaction products flowing in a direction going from the upstream end to the downstream end of said exothermic reaction chamber, and directing the first and second exothermic reactants into the exothermic reaction chamber for exothermically reacting and producing an annular shroud of flame around each reaction tube, said directing of one of the first and second exothermic reactants being effected by a plurality of feed tubes each having an outlet end located at the upstream end of the exothermic reaction chamber and oriented to direct such one exothermic reaction fluid exiting therefrom in a direction substantially parallel to said reaction tubes such that the annular shroud of flame is directed countercurrent to the flow of the endothermic reaction product, removing the exothermic reaction products from said vessel after passage through said exothermic reaction chamber, and wherein said separately supplying step includes passing the first and second exothermic reactants through a preheating zone within said vessel wherein heat is transferred to said exothermic reactants from said endothermic reaction product for preheating the exothermic reactants prior to mixing and reacting and for cooling said endothermic reaction product prior to removal from said vessel.

14. The endothermic reaction process of claim 13, wherein said first and second exothermic reactants are heated sufficiently so as to autoignite when mixed together in said exothermic reaction chamber.

15. The endothermic reaction process of claim 13, wherein an endothermic reaction catalyst is used in said reaction tubes.

16. The endothermic reaction process of claim 13, wherein one of said exothermic reactants is passed through an annular passage formed between a downstream portion of each reaction tube in the direction of the flow of said endothermic product and a respective supply tube for transfer of heat from said endothermic reaction product to said one of said exothermic reactants to heat the same prior to being mixed and reacted with the other of said exothermic reactants.

17. The endothermic reaction process of claim 16, wherein the other of said exothermic reactants is passed through an annular passage formed between said one supply tube and another supply tube for transfer of heat from said endothermic reaction product to said exothermic reactants to heat the same prior to being mixed and reacted with one another.

18. The endothermic reaction process of claim 13, wherein said plurality of reaction tubes are straight and parallel.

19. The endothermic reaction process of claim 13, wherein the endothermic reactant and reaction product flow countercurrently to the exothermic reactants and reaction products.

20. The endothermic reaction process of claim 19, wherein the vessel is elongated and the endothermic reactant and reaction product flow in a first longitudinal direction and the exothermic reactants and reaction products flow in a second longitudinal direction opposite said first longitudinal direction.

21. The endothermic reaction process of claim 13, wherein the difference between the temperature of said exothermic reactants prior to mixing and the maximum endothermic reaction temperature is less than 200 degrees C.

22. An apparatus for carrying out an endothermic reaction in which an endothermic reactant gas is heated by the combustion of air and a combustible fuel gas thereby to cause the reactant gas to form an endothermic product, which apparatus comprises:

vessel;

a plurality of metallic reaction tubes in the vessel dividing the interior of the vessel into a plurality of separate reaction tube flow paths collectively defining a reaction flow path for carrying out the endothermic reaction and a plurality of separate elongated flame flow paths outside the reaction tubes collectively defining a combustion flow path, the reaction flow path and the combustion flow path being in thermal communication with one another so that heat in the combustion flow path can be transferred to the reaction flow path;

respective heat generating means associated with each of the metallic reaction tubes for generating heat by the combustion of fuel gas and air with the resultant flames forming annular shrouds of flames around and extending along the reaction tubes;

an inlet port for causing the reactant gas to flow into the reaction flow path and an exit port for withdrawing endothermic product gas from the reaction flow path;

air and fuel gas supplies respectively adapted to separately supply air and fuel gas to each of the heat generating means, the heat generating means being located in the interior of the vessel whereby the air and fuel gas can be heated to above their autoignition temperature prior to reaching the heat generating means; and an exit path for withdrawing combustion gas from the combustion flow path; and wherein the heat generating means are located at an upstream end of a combustion chamber in the vessel through which the metallic reaction tubes extend from a downstream end to the upstream end of the combustion chamber, and the heat generating means include a plurality of feed tubes respectively associated with the metallic reaction tubes, the feed tubes each having an outlet end located at the upstream end of the combustion chamber and oriented to direct the fuel gas exiting therefrom in a direction substantially parallel to the metallic reaction tubes such that the annular shroud of flame is directed countercurrent to the flow of the reactant gas/endothermic product.

23. An apparatus as set forth in claim 22, wherein the air and gas fuel supplies respectively include a fuel gas feed passageway and an air feed passageway for each tube, the associated air feed passageway and fuel gas feed passageway for each tube being concentric.

24. An apparatus as set forth in claim 22, wherein the reaction tubes contain endothermic reaction catalyst.

25. An apparatus as set forth in claim 22, wherein the vessel is in the form of a shell and the reaction tubes are arranged in the form of a tube heat exchanger having a fixed tube sheet design.

26. An apparatus as set forth in claim 22, wherein the reaction tubes are unsupported intermediate their respective ends.

27. An apparatus as set forth in claim 22, wherein the reaction tubes are essentially straight and essentially parallel.

28. A process for carrying out an endothermic reaction in an endothermic reaction apparatus in which an endothermic reactant gas is heated by the combustion of air and a combustible fuel gas to thereby convert the reactant gas into an endothermic product, the apparatus including:

a vessel;

a plurality of metallic reaction tubes in the vessel dividing the interior of the vessel into a plurality of separate reaction tube flow paths collectively defining a reaction flow path for carrying out the endothermic reaction and a plurality of separate elongated flame flow paths outside the reaction tubes collectively defining a combustion flow path, the reaction flow path and the combustion flow path being in thermal communication with one another so that heat in the combustion flow path can be transferred to the reaction flow path;

respective heat generating means associated with each of the metallic reaction tubes for generating heat by the combustion of fuel gas and air with the resultant flames forming annular shrouds of flames around and extending along the reaction tubes;

an inlet port for causing the reactant gas to flow into the reaction flow path an exit port for withdrawing endothermic product gas from the reaction flow path; and air and fuel gas supplies respectively adapted to separately supply air and fuel gas to each of the heat generating means, the heat generating means being located in the interior of the vessel whereby the air and fuel gas can be heated to above their autoignition temperature prior to reaching the heat generating means, and an exit path for withdrawing combustion gas from the combustion flow path; and wherein the heat generating means are located at an upstream end of a combustion chamber in the vessel through which the metallic reaction tubes extend from a downstream end to the upstream end of the combustion chamber, and the heat generating means include a plurality of feed tubes respectively associated with the metallic reaction tubes, the feed tubes each having an outlet end located at the upstream end of the combustion chamber and oriented to direct the fuel gas exiting therefrom in a direction substantially parallel to the metallic reaction tubes such that the annular shroud of flame is directed countercurrent to the flow of the reactant gas/endothermic product;

the method comprising:

via the inlet port causing the endothermic reactant gas to flow along the endothermic reactant flow paths, via the air and fuel gas supplies separately feeding the air and the fuel gas to each of the heat generating means, the fuel gas and air being heated to above their autoignition temperature prior to reaching the heat generating means so that the air and fuel gas autoignite and combust to produce heat in the combustion flow path with the resultant flames forming annular shrouds of flames around and extending along the reaction tubes, the heat being transferred to the endothermic reaction flow paths thereby causing the endothermic reaction to occur, via the outlet port withdrawing endothermic product gas from the reaction flow path, and via the exit path withdrawing combustion gas from the combustion flow path.

29. A process according to claim 28, wherein the reaction tubes contain an endothermic reaction catalyst.

30. A process as set forth in claim 28, wherein the endothermic reactant gas is a mixture of a gaseous hydrocarbon and steam whereby the endothermic product is synthesis gas.

31. A process as set forth in claim 30, wherein the gaseous hydrocarbon is methane.

32. A process as set forth in claim 30, wherein the endothermic reactant gas is heated to a temperature in the range 800 to 1000° C.

33. A process as set forth in claim 30, wherein the pressure in the reaction flow paths is at least 0.508 mPa (10 atm.).

* * * * *